(12) United States Patent
Norman

(10) Patent No.: US 11,433,614 B2
(45) Date of Patent: Sep. 6, 2022

(54) APPARATUS AND METHOD FOR REMOVING UNUSED POWDER FROM A PRINTED WORKPIECE

(71) Applicant: Hamilton Sundstrand Corporation, Charlotte, NC (US)

(72) Inventor: Joshua M. Norman, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 108 days.

(21) Appl. No.: 16/528,203

(22) Filed: Jul. 31, 2019

(65) Prior Publication Data

US 2021/0031453 A1   Feb. 4, 2021

(51) Int. Cl.
| | | |
|---|---|---|
| *B29C 64/35* | (2017.01) | |
| *B33Y 40/00* | (2020.01) | |
| *B28B 11/22* | (2006.01) | |
| *B22F 10/00* | (2021.01) | |

(52) U.S. Cl.
CPC ............ *B29C 64/35* (2017.08); *B28B 11/22* (2013.01); *B33Y 40/00* (2014.12); *B22F 10/00* (2021.01)

(58) Field of Classification Search
CPC ........ B22F 10/28; B22F 10/68; B22F 12/226; B22F 2999/00; B22F 10/00; B22F 10/20; B08B 7/02; B28B 11/22; B29C 64/153; B29C 64/35; B29C 64/379; B33Y 40/00; Y02P 10/25
See application file for complete search history.

(56) References Cited

U.S. PATENT DOCUMENTS

| | | | | |
|---|---|---|---|---|
| 3,503,157 | A * | 3/1970 | Harper | B24B 31/0218 451/329 |
| 4,308,693 | A * | 1/1982 | Harper | B24B 31/0218 451/329 |
| 4,776,135 | A * | 10/1988 | Thum, III | B24B 31/033 451/329 |
| 5,355,638 | A * | 10/1994 | Hoffman | B24B 31/0212 451/32 |
| 8,673,076 | B2 * | 3/2014 | Nakaiso | C23C 16/45578 118/715 |
| 10,052,738 | B2 * | 8/2018 | Twelves, Jr | B24B 31/10 |
| 10,913,206 | B2 * | 2/2021 | Donovan | B29C 64/153 |

(Continued)

FOREIGN PATENT DOCUMENTS

| | | |
|---|---|---|
| CN | 207224605 U | 4/2018 |
| CN | 109732086 A | 5/2019 |

(Continued)

OTHER PUBLICATIONS

CN 208840516 U, EPO Machine Translation created Jun. 5, 2021 (Year: 2021).*

(Continued)

*Primary Examiner* — Duy Vu N Deo
*Assistant Examiner* — Christopher Remavege
(74) *Attorney, Agent, or Firm* — Cantor Colburn LLP

(57) ABSTRACT

Disclosed is an apparatus for depowdering a workpiece printed from a laser powder bed fusion process, having: a base; a turntable that rotates relative to the base, the turntable configured to receive the workpiece; and in operation, when the turntable is rotating, rotational forces applied to the workpiece depowder the workpiece.

9 Claims, 4 Drawing Sheets

(56) References Cited

U.S. PATENT DOCUMENTS

| | | | |
|---|---|---|---|
| 11,072,117 B2* | 7/2021 | Hellestam | B29C 64/236 |
| 11,084,216 B2* | 8/2021 | Murillo | B29C 64/245 |
| 11,123,924 B2* | 9/2021 | McMurtry | B29C 64/268 |
| 11,148,362 B2* | 10/2021 | Crump | B29C 64/165 |
| 2003/0152659 A1* | 8/2003 | McCloskey | A23G 3/50 |
| | | | 249/126 |
| 2005/0048203 A1* | 3/2005 | Becker | C23C 26/00 |
| | | | 427/240 |
| 2006/0192322 A1* | 8/2006 | Abe | B29C 64/153 |
| | | | 264/497 |
| 2009/0025638 A1* | 1/2009 | Inoue | B29C 64/165 |
| | | | 118/712 |
| 2009/0283119 A1* | 11/2009 | Moussa | B29C 71/04 |
| | | | 134/57 R |
| 2016/0279871 A1* | 9/2016 | Heugel | B08B 7/02 |
| 2017/0136543 A1* | 5/2017 | Hermann | B23K 26/342 |
| 2017/0232670 A1 | 8/2017 | Joerger et al. | |
| 2019/0009338 A1 | 1/2019 | McMurtry et al. | |
| 2019/0126555 A1* | 5/2019 | Lebed | B08B 7/02 |
| 2019/0160749 A1* | 5/2019 | Hellestam | B29C 64/153 |
| 2019/0291347 A1* | 9/2019 | Price | B29C 64/124 |
| 2021/0308947 A1* | 10/2021 | Diez | B33Y 40/20 |

FOREIGN PATENT DOCUMENTS

| | | | |
|---|---|---|---|
| CN | 208840516 U | * | 5/2019 |
| CN | 208840516 U | | 5/2019 |
| EP | 3257607 A1 | | 12/2017 |
| WO | 2019023120 A1 | | 1/2019 |
| WO | 2019094276 A1 | | 5/2019 |

OTHER PUBLICATIONS

Extended European Search Report; Application No. 19214759.3; dated Apr. 2, 2020; 8 pages.

* cited by examiner

APPARATUS AND METHOD FOR REMOVING UNUSED POWDER FROM A PRINTED WORKPIECE

BACKGROUND

The present embodiments relate to powder bed fusion and more specifically to a system for removing unused powder from a workpiece printed from a laser powder bed fusion process.

Powder bed fusion processes are additive manufacturing processes for printing workpieces from metal, ceramic, polymer, and composite powder materials. These processes induce fusion of particles by exposing them to one or more thermal sources, which are generally laser, or electron beam sources.

Common approaches for fusion in the liquid phase include full melting, liquid-phase sintering, and indirect fusion. Generally, metal, ceramic, and polymer materials capable of being melted and resolidified can be used for these approaches. With full melting, particles are fused by fully melting them with a high-power laser or electron beam. Liquid-phase sintering uses a mixture of two metal powders or a metal alloy, in which the thermal source melts a lower-melting-temperature constituent, but a higher-melting-temperature constituent remains solid. The lower "melting" temperature constituent is sometimes referred to as the binder particle and the higher melting temperature constituent as the structural particle. An example of indirect fusion is a powder material comprising structural particles (e.g., a metal) coated with a binder (e.g., a polymer). Exposure to the thermal source melts the binder, thus inducing fusion, while the structural particle remains solid.

Besides selecting a powder material and a thermal source, these approaches require that powder fusion occur only within prescribed regions of a bed for a workpiece, and to an appropriate depth. Because workpieces are formed layer-by-layer, powder must be properly handled as each layer of the workpiece is deposited and formed. Various aspects of process control may be managed during powder bed fusion. These include laser-related parameters (e.g., laser power, spot size, pulse duration and frequency); scan-related parameters (e.g., scan pattern, speed and spacing); powder-related parameters (e.g., particle shape, size and distribution, powder bed density, layer thickness, material properties, and uniform powder deposition); and temperature related parameters (powder bed temperature, powder material supply temperature, temperature uniformity, and temperature monitoring).

BRIEF DESCRIPTION

Disclosed is an apparatus for depowdering a workpiece printed from a laser powder bed fusion process, comprising: a base; a turntable that rotates relative to the base, the turntable configured to receive the workpiece; and in operation, when the turntable is rotating, rotational forces applied to the workpiece depowder the workpiece.

In addition to one or more of the above disclosed features, or as an alternate, the apparatus includes a platform disposed on the turntable and configured to receive the workpiece; and in operation, the platform rotates to reorient the rotational forces applied to the workpiece.

In addition to one or more of the above disclosed features, or as an alternate, the apparatus includes a plurality of turntables configured for being stacked one on top of the other, configured to receive a respective one of a plurality of workpieces, and in operation, when the plurality of turntables is rotating, rotational forces applied to the plurality of workpieces depowder the plurality of workpieces.

In addition to one or more of the above disclosed features, or as an alternate, the apparatus includes at least one platform disposed on one or more of the turntables and configured to receive the workpieces, and in operation, the at least one platform rotates to reorient the rotational forces applied to the workpieces.

In addition to one or more of the above disclosed features, or as an alternate, the apparatus includes an impulse generator configured to generate an impulse against the turntable, wherein when the turntable rotates, the impulse generator generates the impulse and unused powder is thereby broken from the workpiece.

In addition to one or more of the above disclosed features, or as an alternate, the impulse generator is configured to generate the impulse against a bottom of the turntable.

In addition to one or more of the above disclosed features, or as an alternate, the impulse generator is a hammer.

In addition to one or more of the above disclosed features, or as an alternate, the apparatus includes an impulse generator configured to generate an impulse against the plurality of turntables, wherein when the plurality of turntables rotate, the impulse generator generates the impulse and unused powder is thereby broken from the plurality of workpieces.

In addition to one or more of the above disclosed features, or as an alternate, impulse generator is configured to generate the impulse against a bottom of a bottom-most one of the plurality of turntables.

In addition to one or more of the above disclosed features, or as an alternate, the impulse generator is a hammer.

Disclosed is a method of depowdering a workpiece printed from a laser powder bed fusion process, comprising: positioning the workpiece on a turntable of an apparatus, the turntable being configured to rotate on a base of the apparatus; and rotating the turntable, thereby applying rotational forces to the workpiece to depowder the workpiece.

In addition to one or more of the above disclosed features, or as an alternate, the method includes positioning the workpiece on a platform that is configured to rotate on the turntable, and turning the platform to reorient the rotational forces applied to the workpiece.

In addition to one or more of the above disclosed features, or as an alternate, the method includes generating an impulse against the turntable with an impulse generator of the apparatus when the turntable is rotating to thereby break unused powder from the workpiece.

In addition to one or more of the above disclosed features, or as an alternate, the method includes generating the impulse against a bottom of the turntable.

In addition to one or more of the above disclosed features, or as an alternate, the method includes generating the impulse with a hammer.

Disclosed is a method of depowdering a plurality of workpieces printed from laser powder bed fusion process, comprising: positioning the plurality of workpieces on a respective plurality turntables of an apparatus; stacking the plurality of turntables one on top of the other, and positioning a bottom one of the plurality of turntables on a base of the apparatus; and rotating the plurality of turntables relative to the base, thereby applying rotational forces to the plurality of workpieces to depowder the plurality of workpieces.

In addition to one or more of the above disclosed features, or as an alternate, the method includes distributing the plurality of workpieces on a plurality of platforms that is configured to rotate on plurality of the turntables, and turning the plurality of platforms to reorient the rotational forces applied to the plurality of workpieces.

In addition to one or more of the above disclosed features, or as an alternate, the method includes generating an impulse against at least one of the plurality of turntables with an impulse generator of the apparatus when the plurality of turntables are rotating.

In addition to one or more of the above disclosed features, or as an alternate, the method includes generating the impulse against a bottom of one of the plurality of turntables.

In addition to one or more of the above disclosed features, or as an alternate, the method includes generating the impulse with a hammer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A challenge in printing workpieces with a laser powder bed fusion (LPBF) process is removing unused powder which remains effectively trapped inside the printed workpiece. To remove unused powder from the printed workpiece, it is desirable to break static friction forces between the unused powder and the printed workpiece, and to impart sufficient transferring forces to remove or convey the unused powder away from the workpiece.

Figure 1:
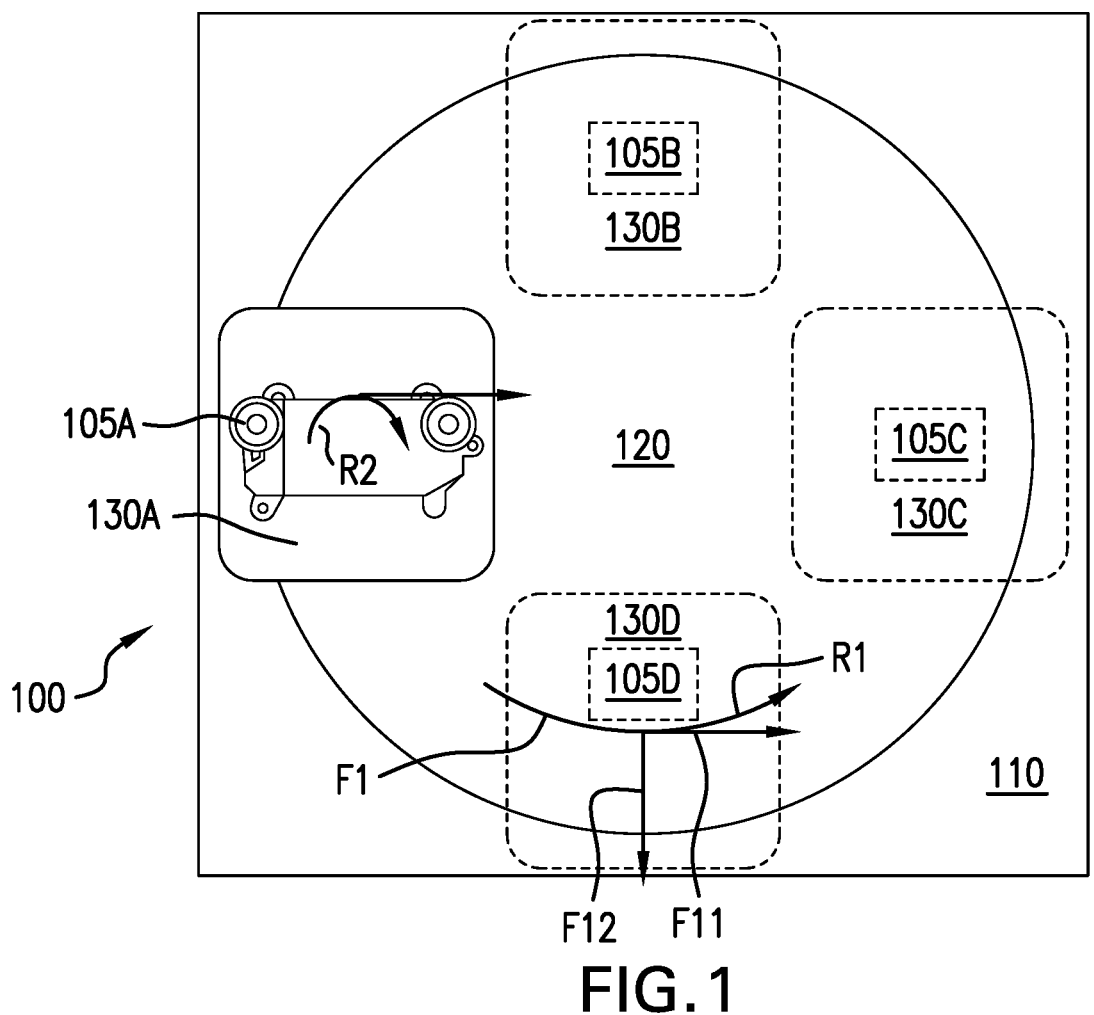
FIG. 1 shows a top view of an apparatus for depowdering a workpiece according to an embodiment.
Figure 2:
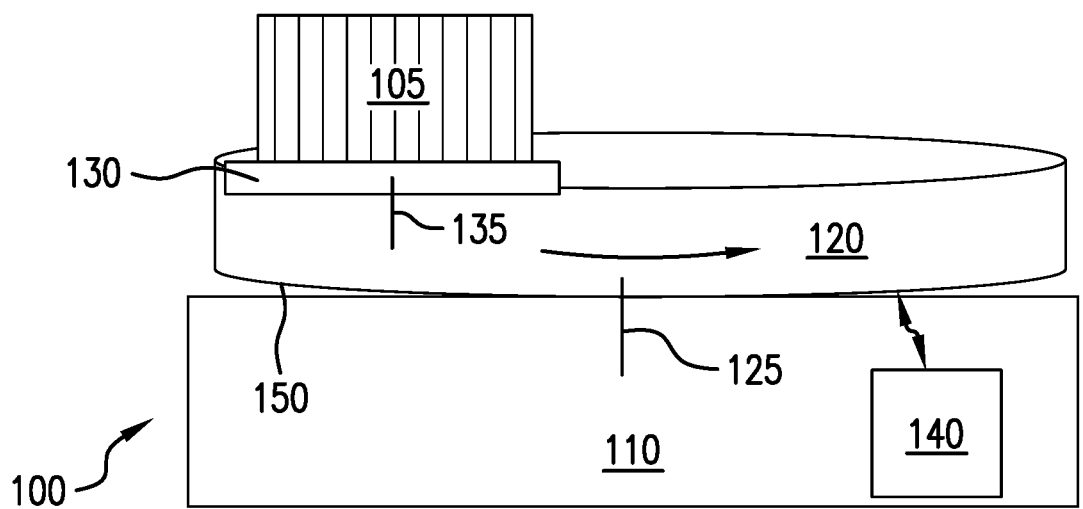
FIG. 2 shows a side view of the apparatus of FIG. 1.

Turning to FIGS. 1 and 2, disclosed is an apparatus 100 for depowdering a workpiece 105A printed using a LPBF process. The apparatus 100 includes a base 110, which is a stationary structure such as a machine stand or other table. The apparatus also includes a turntable 120 that is configured to rotate on the base 110. For example, the turntable 120 is connected to the base 110 by a motorized spindle 125 (illustrated schematically).

The apparatus also includes a platform 130A configured to receive the workpiece 105A and to rotate on the turntable 120. In one embodiment instead one platform 130A, there are a plurality of platforms, such as four platforms 130A-130D (FIG. 1) distributed clockwise about the turntable 120. The platforms 130A-130D may be similarly configured in the system 100. In addition, each may seat a respective workpiece 105A-105D (where 105B-105D are illustrated schematically in FIG. 1). Thus reference to features of platform 130A and workpiece 105A may be interpreted as applying to each platform 130A-130D and each workpiece 105A-105D. As illustrated, the platform 130A is connected to the turntable 120 by another motorized spindle 135 (illustrated schematically).

The turntable 120 may rotate in the direction R1 to depowder the workpiece 105A. As illustrated, in one embodiment the turntable 120 is configured to rotate in the direction R1 which may be counterclockwise and the platform 130 is configured to rotate in the direction R2 which may be clockwise, but such rotational motion is not intended to be limiting. For example, in one embodiment the turntable 120 is configured to rotate clockwise and the platform 130 is configured to rotate counterclockwise. In one embodiment the turntable 120 and the platform 130 are configured to rotate clockwise. Further in one embodiment the turntable 120 and the platform 130 are configured to rotate counterclockwise.

As illustrated in FIG. 1 with rotation of the turntable 120 generates, a rotational force F1 from rotation R1 which may be resolved into tangential force F11 as well as outward force F12. These forces, when generated by the turntable 120, are used to convey unused powder away from the workpiece.

In order to change the distribution of the force F1 about the workpiece 105A, the platform 130A may be rotated, for example, incrementally, such as but not limited to one degree, ninety degrees, or by any amount. Such rotation will reorient the rotational forces F1 against the workpiece 105A and all powder thereon, improving an ability to depowder the workpiece 105A.

In one embodiment the apparatus 100 includes an impulse generator 140 (illustrated schematically), which may be installed in the base 110. The impulse generator 140 is configured to generate an impulse against the turntable 120 when the turntable 120 is rotating. When the impulse generator 140 generates an impulse, static friction forces acting on the unused powder may be broken, thereby increasing the effectiveness of the transferring forces and enabling more efficient depowdering of the workpiece 105. In one embodiment the impulse generator 140 is configured to generate the impulse against a bottom 150 of the turntable 120. The generator can be an automatic hammer such as a pneumatic hammer.

In one embodiment rather than automatically rotating the platform 130A, the platform 130A may be rotationally fixed to the turntable 120 by a latch or pin which may be released to manually rotate the platform 130A. It is to be appreciated that the action of the platform 130A and impulse generator 140 may improve an ability to depowder the workpiece 105A relative to an embodiment without such implements. However, an embodiment without such implements is within the scope of the disclosure. That is, such embodiment would apply the rotational forces F1 to the workpiece 105A due to rotation R1 of the turntable, thus depowder the workpiece 105A.

Figure 3:
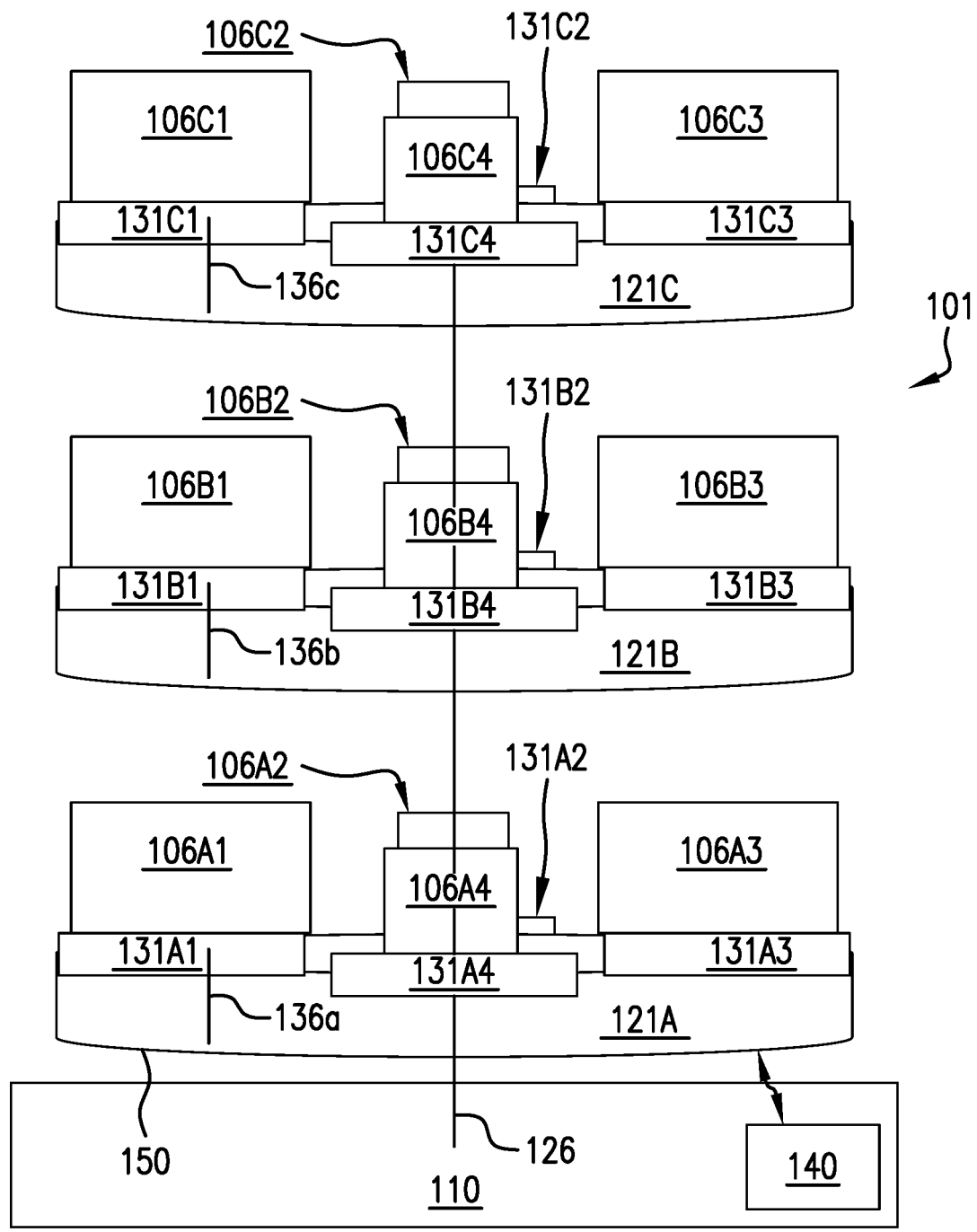
FIG. 3 shows a side view of an apparatus for depowdering a plurality of printed workpieces according to an embodiment.

Turning to FIG. 3, in one embodiment the apparatus 101, which may be the same as apparatus 100 except as indicated herein, includes a plurality of turntables 121. As illustratively shown, the plurality of turntables includes a first turntable 121A, a second turntable 121B, and a third turntable 121C. Of course, a different configuration or number of turntables 121 could be provided. The plurality of turntables 121 is configured for being stacked one on top of the other. Each of the plurality of turntables 121 is configured to rotate relative to the base 110. For example, the plurality of turntables 121 is connected to the base 110 by the motorized spindle 126 (illustrated schematically).

Each of the turntables 121 may be similarly configured and each may be configured similarly to turntable 120. For example, each may contain four platforms generally referred to as 131 distributed clockwise thereon including platforms 131A1-131A4 on turntable 121A, platforms 131B1-131B4 on platform 121B and platforms 131C1-131C4 on turntable 121C (each of platforms 131A4, 131B4 and 131C4 is illustrated schematically). The plurality of platforms 131 may be connected to rotate against the respective turntables 121 by a respective plurality of motorized spindles 136. The plurality of motorized spindles 136 includes a first spindle 136A, a second spindle 136B and a third spindle 136C. The plurality of platforms 131 is configured to receive one of a respective plurality of workpieces 106, for example, including workpiece 106A1-106A4 on platform 131A1-131A4, workpieces 106B1-106B4 on platforms 131B1-131B4 and workpiece 106C1-106C4 on platforms 131C1-131C4 (each of workpieces 106A4, 106B4 and 106C4 is illustrated schematically).

In one embodiment, the plurality of turntables 121 may rotate along axis R1 (FIG. 1) to depowder the plurality of workpieces 106. In one embodiment the plurality of turntables 121 is configured to rotate counterclockwise and the plurality of platforms 131 is configured to rotate clockwise, but such rotational motion is not intended to be limiting. For example, in one embodiment the plurality of turntables 121 is configured to rotate clockwise and the plurality of platforms 131 is configured to rotate counterclockwise. In one embodiment the plurality of turntables 121 and the plurality of platforms 131 are configured to rotate clockwise. Further in one embodiment the plurality of turntables 121 and the plurality of platforms 131 are configured to rotate counterclockwise.

In one embodiment the apparatus 100 illustrated in FIG. 3 also includes the impulse generator 140 (illustrated schematically), which may be installed in the base 110. The impulse generator 140 is configured to generate an impulse against at least one of the plurality of turntables 121 when the plurality of turntables 121 are rotating. When the impulse generator 140 generates an impulse, unused and loosened powder may be thereby broken from the plurality of workpieces 106, enabling more efficient depowdering of the plurality of workpieces 106. In one embodiment the impulse generator 140 is configured to generate the impulse against a bottom 150 of the first turntable 121A, which is a bottom-most one of the turntables 121. In one embodiment the impulse generator 140 is an automatic hammer. In one embodiment the automatic hammer is a pneumatic hammer.

In one embodiment rather than automatically rotating the plurality of platforms 131, the platforms 131 may be rotationally fixed to the turntable 121 by respective latches or pins which may be released to manually rotate the plurality of platforms 131. It is to be appreciated that the action of the platforms 131 and impulse generator 140 may improve an ability to depowder the workpiece 106 relative to an embodiment without such implements. However, an embodiment without such implements is within the scope of the disclosure. That is, as with FIG. 1, such embodiment would apply the rotational forces F1 to the workpieces 106 due to rotation R1 of the turntables 121, thus depowder the workpieces 106.

Figure 4:
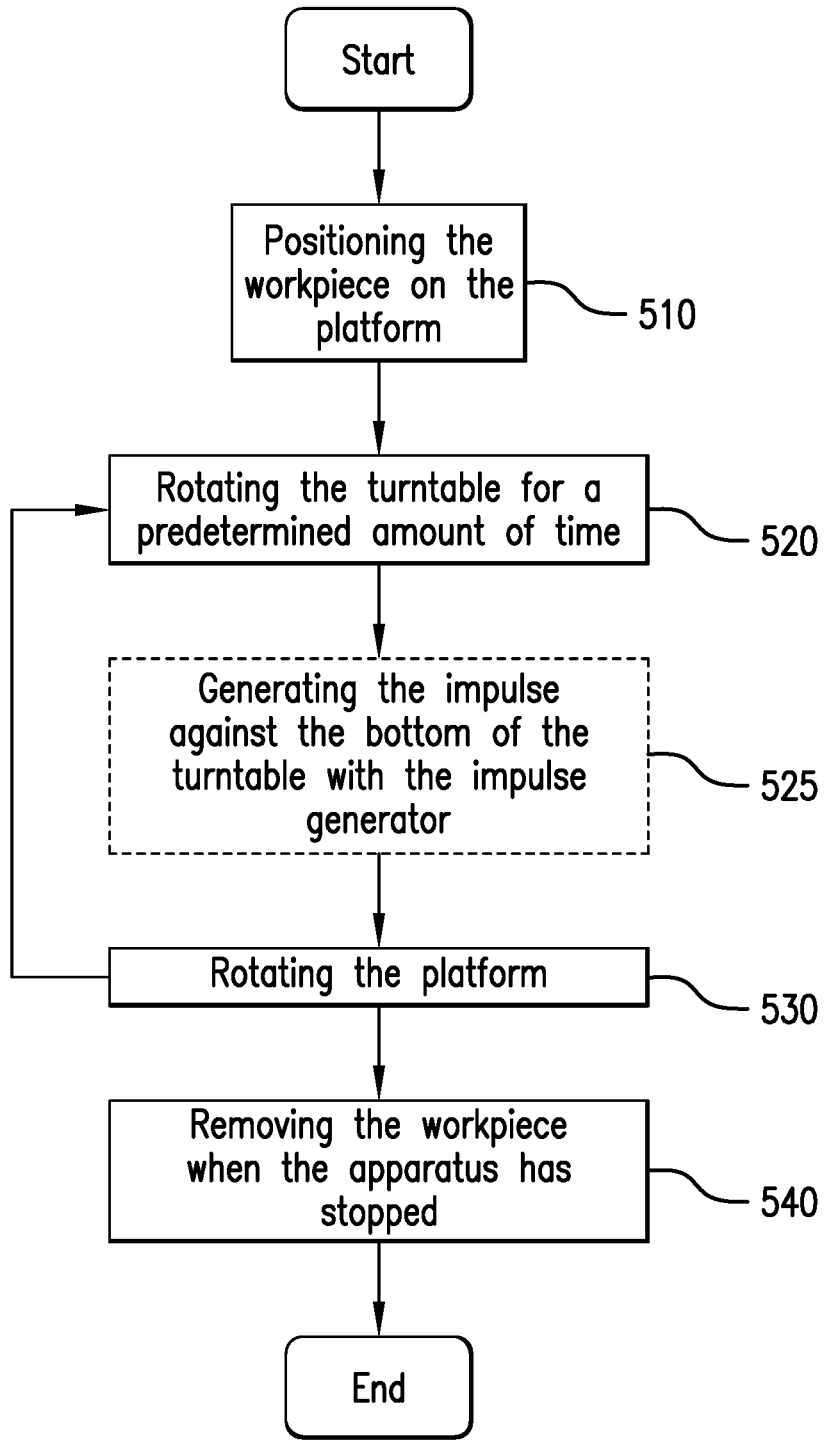
FIG. 4 is a flowchart showing a method of depowdering a workpiece with the apparatus of FIGS. 1 and 2 according to an embodiment.

Turning to FIG. 4, a flowchart shows a method of depowdering a workpiece 105A printed from an LPBF process. Block 510 shows that the method includes positioning the workpiece 105A on the platform 130A of the apparatus 100 (FIGS. 1-2). Block 520 shows that the method includes rotating the turntable 120 for a predetermined period of time to loosen unused powder from the workpiece 105. As shown in block 525, the method may optionally include generating the impulse against the bottom 150 of the turntable 120 with the impulse generator 140 while the turntable 120 is rotating. The impulse generator breaks unused powered from the workpiece 105A and may more effectively remove unused powder. Block 530 shows that the method includes rotating the platform 120A, to change an orientation of the workpiece 105 on the turntable 120, to thereby change a distribution of rotational forces applied when rotating the turntable 120. As indicated, this enhances a removal of unused powder from the workpiece 105. The portion of the processes illustrated in blocks 520-530 may be repeated to continue to remove unused powder from the workpiece 105A. Block 540 shows that the method includes removing the workpiece 105A from the platform 130 when the apparatus 100 has stopped.

Figure 5:
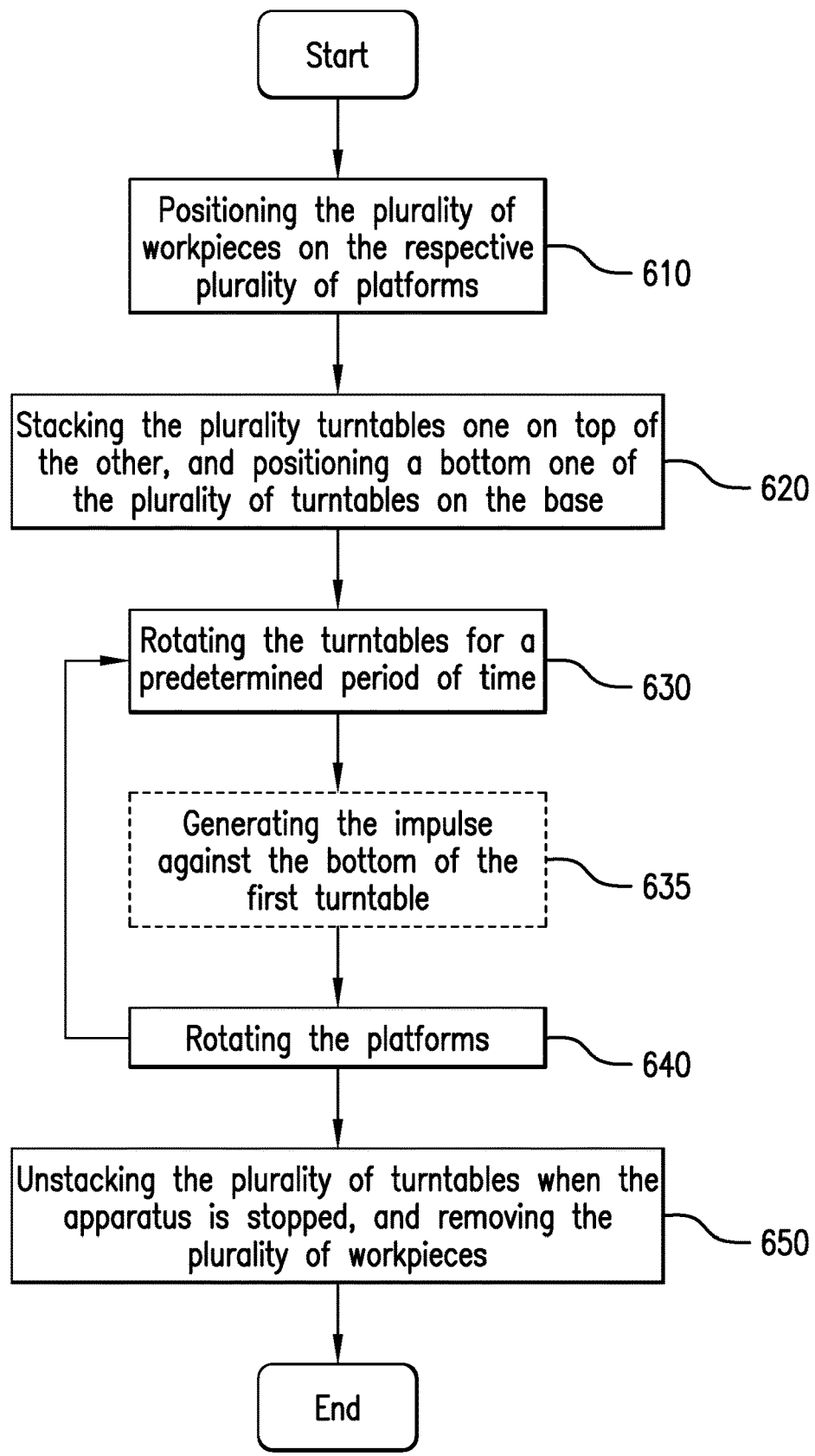
FIG. 5 is a flowchart showing a method of depowdering a plurality of workpieces with the apparatus of FIG. 3 according to an embodiment.

Turning to FIG. 5, a flowchart shows a method of depowdering the plurality of workpieces 106 printed from an LPBF process. Block 610 shows that the method includes positioning the plurality of workpieces 106 on the respective plurality of platforms 131 of the apparatus 101 (FIG. 4). Block 620 shows that the method includes stacking the plurality of turntables 121 one on top of the other, with the first turntable 121A, being the bottom-most turntable, positioned against the base 110. Block 630 shows that the method includes rotating the plurality of turntables 121 for a predetermined period of time. This loosens unused powder from the respective plurality of workpieces 106. As shown in block 635 the method may optionally include generating the impulse against the bottom 150 of the first turntable 121A with the impulse generator 140 while the plurality of turntables 121 are rotating. This breaks unused powder from the plurality of workpieces 106. Block 640 shows that the method further includes rotating the plurality of platforms 131, to change an orientation of the workpieces 106 on the turntables 121, to thereby change a distribution of rotational forces applied when rotation the turntables 121. As indicated, this enhances a removal of unused powder from the plurality of workpieces 106. The portion of the processes illustrated in blocks 630-640 may be repeated to continue to remove unused powder from the workpiece 106. 121. Block 650 shows that the method includes unstacking the plurality of turntables 121 when the apparatus 101 is stopped, and removing the plurality of workpieces 106 from the plurality of platforms 131.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for depowdering a workpiece printed from a laser powder bed fusion process, comprising:
   a base;
   a turntable that rotates on, and relative to, the base, the turntable configured to receive the workpiece via a platform,
   wherein in operation, when the turntable is rotating, rotational forces applied to the workpiece depowder the workpiece, and
   wherein the platform is disposed on the turntable, connected to the turntable by a motorized spindle, and configured to receive the workpiece, and
   wherein in operation, the turntable is configured to rotate in one direction R1 and the platform is configured to rotate in another direction R2, to thereby reorient the rotational forces applied to the workpiece, wherein: R1 is clockwise and R2 is counterclockwise; or R2 is clockwise and R1 is counterclockwise:
   a plurality of turntables configured for being stacked one on top of the other, configured to receive respective one of a plurality of workpieces, and in operation, when the plurality of turntables is rotating, rotational forces applied to the plurality of workpieces depowder the plurality of workpieces,
   wherein at least one platform is disposed on each of the turntables and configured to receive the workpieces, and in operation, the at least one platform rotates to reorient the rotational forces applied to the workpieces; and
   an impulse generator, that is a pneumatic hammer, is configured to generate an impulse against the bottom-most one of the turntables, wherein when the turntables rotate, the impulse generator generates the impulse and powder is thereby broken from the workpiece.

2. A method of depowdering a workpiece printed from a laser powder bed fusion process, comprising:
   positioning the workpiece on a turntable of an apparatus via a platform, the turntable being configured to rotate on, and relative to, a base of the apparatus; and
   rotating the turntable, thereby applying rotational forces to the workpiece to depowder the workpiece, wherein the platform is disposed on the turntable, connected to the turntable by a motorized spindle, and receives the workpiece; and
   the turntable rotates in one direction R1 and the platform rotates in another direction R2, to thereby reorient the rotational forces applied to the workpiece,
   wherein: R1 is clockwise and R2 is counterclockwise; or R2 is clockwise and R1 is counterclockwise, wherein the apparatus includes:
   a plurality of turntables configured for being stacked one on top of the other, configured to receive a respective one of a plurality of workpieces, and in operation, when the plurality of turntables is rotating, rotational forces applied to the plurality of workpieces depowder the plurality of workpieces,
   wherein at least one platform is disposed on each of the turntables and configured to receive the workpieces, and in operation, the at least one platform rotates to reorient the rotational forces applied to the workpieces; and
   an impulse generator, that is a pneumatic hammer, is configured to generate an impulse against the bottom-most one of the turntables, wherein when the turntables rotate, the impulse generator generates the impulse and powder is thereby broken from the workpiece.

3. The method of claim 2, comprising generating the impulse against the turntable with the impulse generator of the apparatus when the turntable is rotating to thereby break powder from the workpiece.

4. The method of claim 3, comprising generating the impulse against the bottom of the turntable.

5. The method of claim 4, comprising generating the impulse with the pneumatic hammer.

6. A method of depowdering a plurality of workpieces printed from laser powder bed fusion process, comprising:
   positioning the plurality of workpieces on a respective plurality turntables of an apparatus via a respective plurality of platforms;
   stacking the plurality of turntables one on top of the other, and positioning a bottom one of the plurality of turntables on a base of the apparatus; and
   rotating the plurality of turntables relative to the base, thereby applying rotational forces to the plurality of workpieces to depowder the plurality of workpieces,
   wherein the plurality of platforms are connected to the plurality of turntables by a plurality of motorized spindles so that the plurality of platforms rotate relative to the plurality of the turntables, and
   the method includes:
   turning the turntable in one direction R1 and turning the plurality of platforms in another direction R2, to thereby reorient the rotational forces applied to the plurality of workpieces,
   wherein: R1 is clockwise and R2 is counterclockwise; or R2 is clockwise and R1 is counterclockwise:
   wherein the apparatus includes an impulse generator, that is a pneumatic hammer, is configured to generate an impulse against the bottom-most one of the turntables, wherein when the turntables rotates, the impulse generator generates the impulse and powder is thereby broken from the workpiece.

7. The method of claim 6, comprising generating the impulse against at least one of the plurality of turntables with the impulse generator of the apparatus when the plurality of turntables are rotating.

8. The method of claim 7, comprising generating the impulse against the bottom of one of the plurality of turntables.

9. The method of claim 8, comprising generating the impulse with the pneumatic hammer.

* * * * *